June 13, 1939.    C. J. JENNY    2,162,308
DIAPHRAGM DEVICE
Filed July 21, 1936    2 Sheets-Sheet 1

INVENTOR.
Cletus J. Jenny
BY Stephen Gerstvik
ATTORNEY.

June 13, 1939.  C. J. JENNY  2,162,308
DIAPHRAGM DEVICE
Filed July 21, 1936   2 Sheets-Sheet 2

MODULVAR (INVAR)
$\frac{\Delta\varepsilon}{\Delta T} = +.000482$

| MODULVAR (INVAR) | |
|---|---|
| Ni | 34.9 % |
| Fe | 64.5 % |
| Si | .14 % |
| Cr | .12 % |
| Mn | .18 % |
| C | .16 % |

ELINVAR
$\frac{\Delta\varepsilon}{\Delta T} = 0$

| ELINVAR | |
|---|---|
| Ni | 32 – 36 % |
| Fe | 61 – 53 % |
| Cr | 4 – 12 % |
| W | 1 – 4 % |
| Be | 0.5 – 2.5 % |
| Si | 0.5 – 2 % |
| C | 0.5 – 2 % |
| Mn | 0.5 – 2 % |

INVENTOR.
Cletus J. Jenny
BY Stephen Cerstvik
ATTORNEY.

Patented June 13, 1939

2,162,308

UNITED STATES PATENT OFFICE 2,162,308

DIAPHRAGM DEVICE

Cletus J. Jenny, East Orange, N. J., assignor to Bendix Aviation Corporation, South Bend, Ind., a corporation of Delaware Application July 21, 1936, Serial No. 91,783

6 Claims. (Cl. 137—156.5)

The present invention relates to expansible and contractible diaphragm devices such as diaphragm devices comprising either a single flexible metal disc which will deflect when subjected to differential pressures on the sides thereof, or a pair of flexible metal discs joined together to form an expansible chamber which will expand and contract due to a preponderance of pressure on the inside or outside of said chamber. More particularly the invention relates to the elimination of temperature errors in flexible metal diaphragms.

Diaphragm devices of the above type may be corrugated or otherwise and may be built up in series to form a plurality of chambers for cumulative or increased action, and may be used to actuate various devices as, for example, pressure regulators in accordance with pressure or suction or changes in pressure or suction to provide an automatic control, or they may be used in instruments for measuring and indicating pressure or suction or changes in pressure or suction as, for example, in pressure gages, suction gages, aircraft air speed indicators, aneroid altimeters or barometers, barographs, aircraft rate of climb or vertical speed indicators, hydrostatic fuel gages, etc.

When used in instruments, a diaphragm device of the class described is caused to deflect, i. e., expand or contract when pressure or suction is applied thereto and the motion thus produced by the flexible wall or walls of the device is transmitted through a suitable mechanism, generally an amplifying mechanism, to a pointer or dial or other suitable indicating device to indicate pressure, changes of pressure, or other units which depend on pressure. It is to be understood that the term "pressure", as used herein, may mean sub-atmospheric pressure or super-atmospheric pressure.

Certain instruments as, for example, aircraft instruments, by their very nature, are subject to a very wide range of temperatures because they are required to operate at many altitudes and in many climates. For example, on any one flight of an aircraft the change in temperature may be very fast as when the craft climbs to a high altitude or descends from a high altitude. The effect of such changes in temperature from either a relatively low temperature to a relatively high temperature or vice versa is two-fold. First, the frame, links, levers, gears, shafts and other parts of the instrument mechanism change their dimensions and possibly their shapes. In cold temperatures, for example, the dimensions of such parts decrease in proportion to the temperature drop.

The second effect, and the one to which this invention is mostly applicable, has to do with the change in the physical characteristics of the material out of which the diaphragm devices are made.

A metal diaphragm device is an elastic element and the deflection obtained from it depends on the pressure applied thereto, the shape and number of radially spaced corrugations on the metal disc or discs, if corrugated, and also on the modulus of elasticity of the metal used.

Once a diaphragm device is made, the deflection thereof at a given pressure will always be the same provided the modulus of elasticity of the material does not change. However, the modulus of elasticity of the generally used spring and diaphragm materials is affected by temperature and if an instrument with a flexible metal diaphragm is subjected to a temperature different from that at which it was calibrated, then the deflection at a given pressure is no longer the same and the indication of the instrument is erroneous. This effect is, of course, most pronounced at extremely hot and cold temperatures. The rate of change of the modulus of elasticity of a metal per degree temperature is referred to as the thermoelastic coefficient or temperature coefficient of modulus of elasticity of the metal.

Also, aircraft instruments are generally tested at room temperature (approximately 21° C.) and at a cold temperature of about —35° C. and it has been found that when an instrument using diaphragm devices of the prior art which require bi-metal or other separate compensators is passing from one extreme temperature to another, as, for example, from room temperature to —35° C., the temperature change does not have an immediate effect on all the parts of the instrument. The result is that the reading of the instrument lags from the true reading as the bi-metal or other separate compensator does not change in temperature at the same rate as the prior art diaphragms and equilibrium is reached only when the temperature has its full effect on all parts, at which time the reading again becomes correct. Therefore, there is a definite time interval before the instrument returns to the correct reading.

Heretofore, bi-metal strips have been employed in the transmission mechanism between the diaphragm device and the pointer to overcome both the effect of a change in the modulus of elasticity of the diaphragm material due to changes in temperature and the effect of the change in dimensions and change in shape of the parts because of expansion and contraction of such parts due to changes in temperature. The method of overcoming the first effect is generally referred to as "range compensation" and the method of overcoming the second effect is generally referred to as "zero compensation".

It is one of the objects of the present invention to overcome the above disadvantages by providing a diaphragm device which is self-compensating for changes in temperature thereby rendering it unnecessary to compensate an instrument provided with such a diaphragm device whereby the instrument will give correct readings at all temperatures as, for example, between —50° and +50° C.

Another object of the invention is to provide a novel expansible diaphragm device which is self-compensated for changes in temperature, comprising a pair of flexible metal discs joined together along their peripheries to form an expansible chamber, one of said discs being of metal having a positive temperature coefficient of modulus of elasticity and the other being of metal having a negative temperature coefficient of modulus of elasticity whereby the resulting net change in elasticity of the two discs as a unit due to changes in temperature is substantially zero and, therefore, the expansion and contraction of the chamber will always be the same amount for a given pressure regardless of temperature, i. e., the only deflection will be that produced by pressure.

The above and other objects and advantages of the invention will appear more fully hereinafter from a consideration of the detailed description which follows taken together with the accompanying drawings wherein several embodiments of the invention are illustrated. It is to be expressly understood, however, that the drawings are for the purpose of illustration only and are not designed as a definition of the limits of the invention, reference being had to the appended claims for this purpose.

In the drawings wherein like reference characters refer to like parts throughout the several views, Fig. 1 is a front elevation of one form of expansible diaphragm device embodying the present invention;

Figure 1:
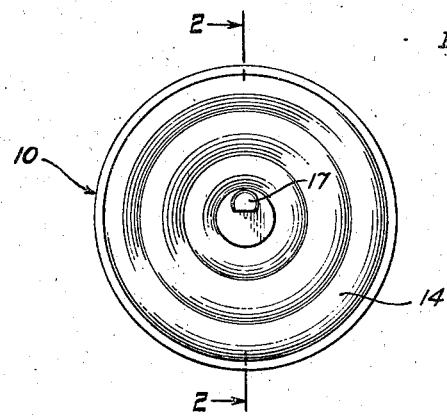

The invention consists substantially in the construction, combination, composition, location and relative arrangement of parts for obtaining the results desired in accordance with the objects hereinbefore stated, as will be more fully hereinafter set forth in the specification, as shown in the drawings, by way of example, and as finally pointed out in the claims.

To attain the objects of the invention the diaphragm device may be made up of a single unit comprising two flexible metal discs joined together at their peripheries to form an expansible and contractible chamber, or the device may be made up of two or more pairs of flexible metal discs, each pair of discs being joined at the peripheries and the pairs being connected together for cumulative or increased action.

In accordance with the invention one disc of a pair is made of a diaphragm metal which is characterized by an increase in the elastic modulus at cold temperatures so that at a low temperature the diaphragm gives less deflection than at room temperature. Such diaphragm metal may be German silver having a negative temperature coefficient of modulus of elasticity of from —.00034 to —.00038, or phosphor bronze having a temperature coefficient of modulus of elasticity of approximately from —.00036 to —.00038, or beryllium copper having a temperature coefficient of modulus of elasticity of approximately —.00035. The other disc of a pair is made of a metal which is characterized by a decrease in the elastic modulus at cold temperatures. Such metal may be a nickel-iron alloy such as "Modulvar" having a positive temperature coefficient of modulus of elasticity of approximately +.000482 and its thermal coefficient of expansion is substantially zero. See page 305, Bureau of Standards Research Paper No. 531, volume 10, March 1933. "Modulvar" has approximately the following composition: nickel—34.9%; iron—64.9%; silicon—.14%; chromium—.12%; manganese—.18%; carbon—.16%. See page 297, Bureau of Standards Research Paper No. 531 previously referred to.

By making the diaphragm devices of metals as above described, the decrease in elasticity of one disc of a pair is balanced by the increase in elasticity of the other disc of the pair. Hence, the elastic modulus of the two discs of a pair as one unit remains unchanged at cold temperatures or at high temperatures. The temperature coefficients of modulus of elasticity as given above for the various metals are average values for temperatures between —50° to +50° C.

Figure 2:
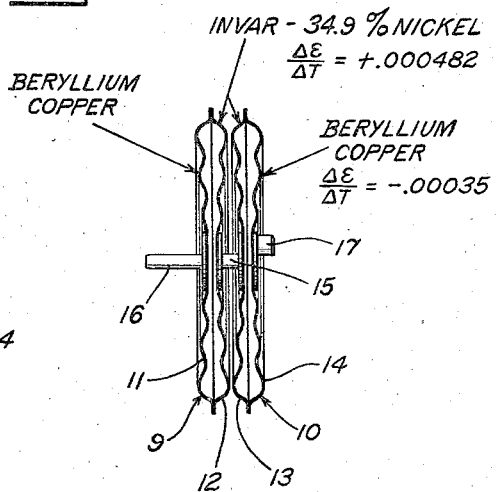
Fig. 2 is a vertical section taken on line 2—2 of Fig. 1.

Referring now to the drawings and more particularly to Figs. 1 and 2, there are shown two diaphragm devices 9 and 10 one of which is made up of a pair of flexible corrugated metal discs 11 and 12 and the other of which is made up of a pair of flexible corrugated metal discs 13 and 14. The devices 9 and 10 are joined together at their centers by a post 15. If the devices are to be used in an aneroid altimeter or barometer they are then evacuated so that they will expand as the outside atmospheric pressure decreases upon an increase in altitude and vice versa. The device 9 is provided with a post 16 for adjustably and fixedly securing it in an instrument casing, and the device 10 is provided with a lug 17 to which one end of a suitable transmission mechanism may be connected for causing the expansion and contraction of the two devices 9 and 10 to be transmitted to a suitable indicator (not shown).

In the above-referred to embodiment the corrugated discs 11 and 14 of the devices 9 and 10, respectively, are made of beryllium copper (sometimes called beryllium bronze) containing approximately 97.7% to 98.1% copper and 2.3% to 1.9% beryllium, the temperature coefficient of modulus of elasticity of which is negative and approximately —.00035. See page 305, Bureau of Standards Research Paper No. 531. On the other hand, the discs 12 and 13 of the devices 9 and 10, respectively, are made of "Modulvar" which contains approximately 34.9% nickel, 64.5% iron and .6% impurities such as silicon, chromium, manganese and carbon. The thermo-elastic coefficient or temperature coefficient of modulus of elasticity of this alloy is positive and approximately +.000482. Thus the decrease in elasticity of the discs 11 and 14 due to changes in temperature is balanced by the increase in elasticity of the discs 12 and 13 due to the same changes in temperature or vice versa and, hence, the net change in elasticity of the two devices 9 and 10 due to changes in temperature is substantially zero. Accordingly, the only deflection or expansion and contraction of the devices 9 and 10 will be that due to a difference in pressure between the outside and the inside of said devices. Accordingly, the diaphragm devices will be self-compensated and will require no external temperature compensation thereby rendering the use of bi-metal strips in the transmission mechanism unnecessary.

If desired, however, the corrugated discs 11 and 14 may be made of German silver or phosphor bronze instead of beryllium copper. The German silver may have a negative thermoelastic coefficient of from −.000345 to −.000379 and may comprise 60.4% to 64.8% copper; 9.8% to 19.3% nickel; 0 to .05% iron; 16.2% to 25.4% zinc; and 0 to .03% manganese. The phosphor bronze may have a negative thermo-elastic coefficient of from −.00036 to −.00040 and may comprise 94.6% to 95.3% copper; 4.3% to 4.6% tin; 0 to .01% nickel; and .29% to .40% phosphorus.

Figure 3:
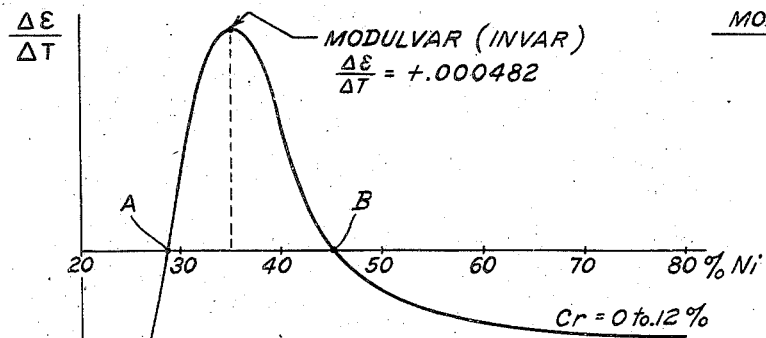
Figs. 3 and 4 are curves showing the relation of the temperature coefficient of modulus of elasticity to the nickel content in nickel-iron alloys which are used for the purpose of this invention.
Figure 4:
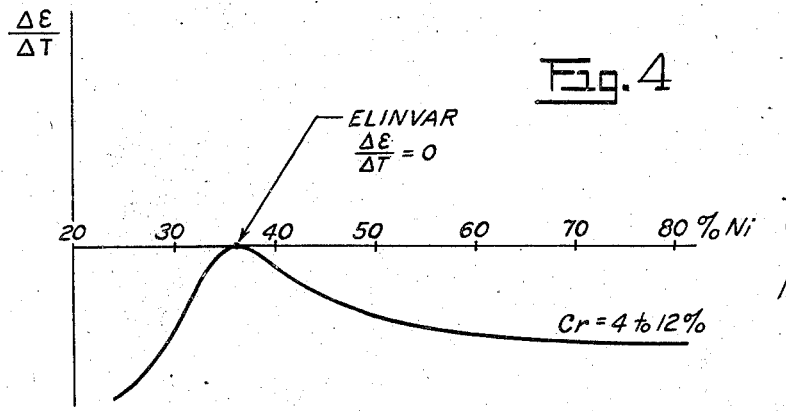

Variations in the thermo-elastic coefficient, i. e., the temperature coefficient of modulus of elasticity $$\left(\frac{\Delta E}{\Delta T}\right)$$

of nickel steels with nickel content, at 20° C. are shown in Figs. 3 and 4 of the drawings. From Fig. 3 it will be seen that "Modulvar" (a specific form of "Invar") containing approximately 34.9% nickel has the highest positive temperature coefficient of modulus of elasticity, namely $$\frac{\Delta E}{\Delta T} = +.000482$$

From the curve in Fig. 3 it will also be seen that in compositions of 29% and 45% nickel, two alloys exist which possess zero temperature coefficients of modulus of elasticity at 20° C.

The curve shown in Fig. 3 may be changed to that shown in Fig. 4 by the substitution of chromium for a portion of the iron, thereby lowering the temperature coefficient of modulus of elasticity of the alloy so that at about 36% nickel the temperature coefficient of modulus of elasticity is zero and is negative for other compositions of from 20% to 80% nickel. The 36% composition of nickel is that of "Elinvar" (Fig. 4).

Figure 5:
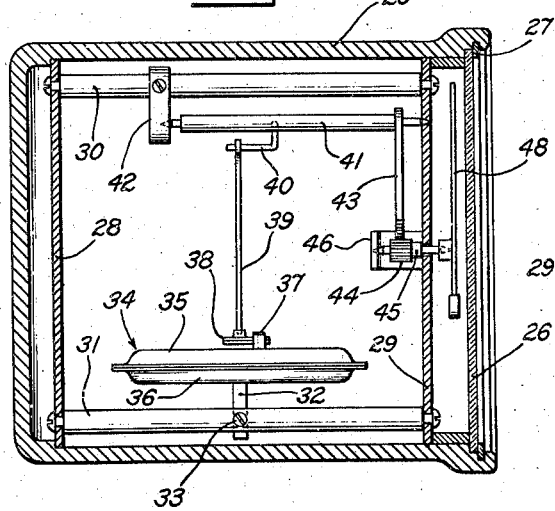
Fig. 5 is a longitudinal section of an indicating instrument provided with a diaphragm device embodying the present invention.

In Fig. 5 there is shown an application of a diaphragm device of the present invention to an altimeter, by way of example. In the form shown, the instrument consists of a cup-shaped instrument casing 25, the open end of which is closed by a cover glass 26 which is held in place by means of a clamping ring 27. Within the casing 25 there is provided the necessary mechanism for producing indications of changes in barometric pressure or altitude. The mechanism is constituted by a pair of plates 28 and 29 spaced apart and secured together by means of spacing rods 30 and 31. On the spacing rod 31 there is adjustably secured by means of a lug 32 and a set screw 33, a diaphragm device 34 made up of two flexible corrugated metal discs 35 and 36 of the form shown in Fig. 2. The disc 35 may be of metal having a negative temperature coefficient of modulus of elasticity such, for example, as beryllium copper, the coefficient of which is −.00035 and the disc 36 may be of a metal having a positive coefficient such, for example, as "Modulvar" of approximately 34.9% nickel composition, the coefficient of which is +.000482.

Figure 6:
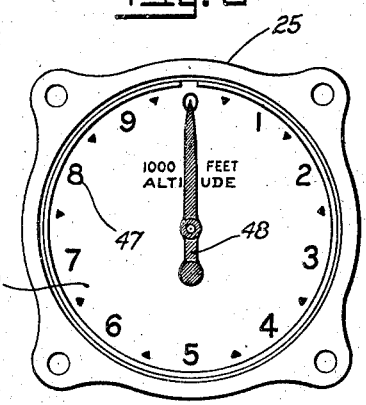
Fig. 6 is a front view of the instrument shown in Fig. 5.

On the disc 35 there is provided a lug 37 to which is secured an arm 38. To the arm 38 there is pivotally connected one end of a link 39 and the other end of the link 39 is connected to an arm 40 which is secured to a rock shaft 41, the latter being journaled at its ends in the front plate 29 and in a bracket 42 carried by the spacing rod 30. At one end of the rock shaft 41 there is secured therto and rockable therewith a gear sector 43 which meshes with a pinion 44 on a pointer shaft 45. One end of said shaft 45 is journaled in a bracket 46 secured to the plate 29 and the other end of said shaft is journaled in the center of the plate 29, the latter plate constituting a dial having an indicating scale 47 calibrated in thousands of feet altitude from zero to 10,000 feet (Fig. 6). On the end of the pointer shaft 45, which projects through the dial plate 29, is carried a pointer 48 which cooperates with the scale 47, the scale 47 and pointer 48 being visible through the cover glass 26. Thus, it will be seen that as the diaphragm device 34 expands and contracts due to changes in barometric pressure or altitude the deflection of said diaphragm will be transmitted to the pointer 48 through the link 39, rock shaft 41, gear sector 43 and pinion 44. Inasmuch as the diaphragm device 34 is made in accordance with the present invention, the instrument shown in Figs. 5 and 6 will not be affected by changes in temperature and, therefore, the pointer 48 will always indicate the correct altitude regardless of the temperature at which the instrument may be.

Heretofore, in instruments of the type shown in Figs. 5 and 6, when a diaphragm device of the prior art was employed, it was necessary to compensate the instrument for changes in temperature and such compensation was generally provided by making the arms 38 and 40 of bi-metal to provide "zero" and "range" compensation, respectively. However, by making the diaphragm device 34 in accordance with the present invention, the use of bi-metal arms may be dispensed with inasmuch as such a diaphragm device is self-compensated.

Also, since the diaphragm device of an altimeter is evacuated, the device is under its greatest stress and strain at sea level or when the altimeter normally reads zero. Therefore, if the diaphragm device is made in accordance with the prior art namely with a negative temperature coefficient a decrease in temperature will increase the modulus of elasticity of the metal and will cause the diaphragm to deflect in the direction towards which it moves when evacuated. This deflection causes the pointer of the altimeter to give an erroneous indication of altitude. A self-compensating diaphragm made in accordance with the present invention eliminates this difficulty since the amount of collapse when evacuating it is the same regardless of temperature, and since the elastic modulus of the diaphragm device as a unit is constant at all temperatures, the expansion and contraction of the diaphragm device is affected only by variations of the external pressure.

In sensitive altimeters using prior art diaphragms with range and zero compensation, at −35° C. the indications varied .45% to 1.05% higher or lower than the corresponding indications at +20° C. between 0 and 35,000 feet altitude, but when diaphragms of the present invention were substituted in the altimeters and no range compensation used, at −35° C. indications varied only .012% to .037% higher or lower than the corresponding indications at +20° C. between 0 and 35,000 feet altitude. Thus, the errors are brought to such negligible amounts as to be substantially zero.

Although only one embodiment of the invention and one application thereof have been shown and described, changes may be made in the composition of the metal discs forming the diaphragm device or devices and the devices may be used in other instrumentalities than that shown without departing from the scope of the invention, as long as the ultimate result is a diaphragm device the deflection of which is due only to a difference in pressure between the inside and outside thereof and which is independent of temperature changes. Reference is, therefore, to be had to the appended claims for a definition of the limits of the invention.

What is claimed is:

1. An expansible diaphragm device which is self-compensated for changes in temperature, comprising a pair of flexible metal discs joined together along their peripheries to form an expansible chamber, one of said discs being of metal having a positive temperature coefficient of modulus of elasticity and the other being of metal having a negative temperature coefficient of modulus of elasticity whereby the resulting net change in elasticity of the two discs due to changes in temperature is substantially zero and, hence, the only expansion and contraction of said chamber will be that produced by a difference in pressure between the inside and outside of said chamber.

2. An expansible diaphragm device which is self-compensated for changes in temperature, comprising a pair of flexible metal discs joined together along their peripheries to form an expansible chamber, one of said discs being of a nickel alloy comprising approximately 34.9% nickel, 64.5% iron and .6% impurities, and the other of said discs being of a copper alloy comprising approximately 97.7% to 98.1% copper and 2.3% to 1.9%, respectively, beryllium.

3. An expansible diaphragm device which is self-compensated for changes in temperature, comprising a pair of flexible metal discs joined together along their peripheries to form an expansible chamber, one of said discs being of a nickel alloy comprising approximately 34.9% nickel; 64.5% iron and .6% impurities, and the other of said discs being of German silver comprising approximately 60.4% to 64.8% copper; 9.8% to 19.3% nickel; 16.2% to 25.4% zinc; and 0 to .05% impurities.

4. An expansible diaphragm device which is self-compensated for changes in temperature, comprising a pair of flexible metal discs joined together along their peripheries to form an expansible chamber, one of said discs being of a nickel alloy comprising approximately 34.9% nickel; 64.5% iron and .6% impurities, and the other of said discs being of phosphor bronze comprising approximately 94.6% to 95.3% copper; 4.3% to 4.6% tin; 0 to .01% nickel; and .29% to .40% phosphorous.

5. An expansible diaphragm device which is self-compensated for changes in temperature, comprising a pair of flexible metal discs joined together along their peripheries to form an expansible chamber, one of said discs being of a metal having a positive thermo-elastic coefficient of approximately +.000482 and the other of said discs being of metal having a negative thermo-elastic coefficient of approximately −.00034 to −.00038.

6. An expansible diaphragm device comprising an expansible chamber, said chamber being so constructed that one part thereof has a positive temperature co-efficient of modulus of elasticity and another part thereof has a negative temperature co-efficient of modulus of elasticity whereby resulting changes in elasticity of these parts are opposed to thereby reduce the effect of the changes in elasticity of said diaphragm.

CLETUS J. JENNY.